United States Patent
Ishimoto (10) Patent No.: US 8,346,453 B2
(45) Date of Patent: Jan. 1, 2013

(54) BRAKING FORCE CONTROL DEVICE FOR VEHICLES THAT CORRECTS A REDUCING AMOUNT OF REQUIRED BRAKING FORCE

(75) Inventor: Takeshi Ishimoto, Yamato (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 243 days.

(21) Appl. No.: 12/919,963

(22) PCT Filed: Feb. 25, 2009

(86) PCT No.: PCT/JP2009/053413
§ 371 (c)(1),
(2), (4) Date: Aug. 27, 2010

(87) PCT Pub. No.: WO2009/107663
PCT Pub. Date: Sep. 3, 2009

(65) Prior Publication Data
US 2011/0004385 A1    Jan. 6, 2011

(30) Foreign Application Priority Data

Feb. 28, 2008  (JP) ................................ 2008-048491
Dec. 25, 2008  (JP) ................................ 2008-331370

(51) Int. Cl.
*G06F 19/00* (2011.01)
(52) U.S. Cl. .......................... 701/70; 303/155; 303/167
(58) Field of Classification Search .................... 701/70; 303/155, 167
See application file for complete search history.

(56) References Cited

U.S. PATENT DOCUMENTS 7,419,229 B2 * 9/2008 Higuchi et al. ............... 701/70
2001/0003402 A1 * 6/2001 Isono et al. .................. 303/155
2005/0057096 A1   3/2005 Kudo
2007/0132312 A1 * 6/2007 Ajiro et al. ................... 303/155
2008/0001475 A1 * 1/2008 Kito et al. .................... 303/155

FOREIGN PATENT DOCUMENTS

JP         8-198075 A       8/1996
(Continued)

OTHER PUBLICATIONS

Translation of document N.*

*Primary Examiner* — Gerald McClain
(74) *Attorney, Agent, or Firm* — Foley & Lardner LLP (57) ABSTRACT

A braking force control device for a vehicle comprises a controller that includes an automatic-brake selective-actuation section configured to compare a manual braking force created by a manual brake device with a required braking force for an automatic brake device and to selectively actuate the automatic brake device when the required braking force exceeds the manual braking force; a braking-force-difference time-rate-of-change calculation section configured to calculate a braking-force-difference time-rate-of-change corresponding to a rate of change per unit time in a difference, which difference is obtained by subtracting the required braking force from the manual braking force; and a required braking force control section configured to correct the required braking force to reduce the required braking force when selectively actuating the automatic brake device and to correct a reducing amount of the required braking force to decrease the reducing amount of the required braking force as the braking-force-difference time-rate-of-change increases.

10 Claims, 9 Drawing Sheets

FOREIGN PATENT DOCUMENTS

| | | | |
|---|---|---|---|
| JP | 11-91523 A | 4/1999 | |
| JP | 2000-168521 A | 6/2000 | |
| JP | 2004-306863 A | 11/2004 | |
| JP | 2004306863 A | * 11/2004 | |
| JP | 2005-82118 A | 3/2005 | |
| JP | 2005-306320 A | 11/2005 | |
| JP | 2006-44590 A | 2/2006 | |

* cited by examiner

BRAKING FORCE CONTROL DEVICE FOR VEHICLES THAT CORRECTS A REDUCING AMOUNT OF REQUIRED BRAKING FORCE

TECHNICAL FIELD

The present invention relates to the control of a hydraulic brake system in which a manual brake, actuated by a driver's operation, and an automatic brake, automatically actuated without driver's operation, are combined with each other.

BACKGROUND ART

A driver's brake-pedal depression occurring during operation of the automatic brake, gives the driver an uncomfortable feeling that the brake pedal is undesirably forced to move down and thus drawn in, due to a less brake-pedal reaction force or an insufficient reaction force weakened as compared to a normal brake-pedal reaction force.

For the purpose of eliminating such an uncomfortable feeling, an automatic brake device, described in a patent document 1, is configured to produce a brake fluid pressure by actuating an automatic brake means, when it is determined that a great deceleration is required to avoid a collision of a host vehicle with a preceding vehicle ahead of the host vehicle, or when it is determined that, when executing an automatic running mode while maintaining a vehicle-to-vehicle distance to the preceding vehicle at a given distance, the vehicle-to-vehicle distance becomes shorter than the given distance. However, in the presence of a driver's brake-pedal depression during operation of the automatic brake means, a transition from the automatic brake state to the manual brake state occurs. In such a situation, the device is configured to open a cut-off valve when a master-cylinder pressure, produced by the driver's braking operation, and a wheel-cylinder pressure, obtained by the automatic brake, become approximately equal to each other, so as to avoid the occurrence of a poor brake feel that a feel of braking operation is temporarily reduced and an uncomfortable feeling such as a brake-pedal kickback. Patent document 1: Japanese patent provisional publication No. JP8-198075 (A)

DISCLOSURE OF THE INVENTION

However, in the prior art automatic brake device as described previously, the automatic brake function becomes canceled or deactivated when a transition from the automatic brake state to the driver's manual brake state occurs. Hence, the device has a problem as hereunder discussed. That is, according to the technology described in the patent document 1, when the braking force created by the driver's manual brake is less than the braking force created by the automatic brake during a transition from the automatic brake state to the manual brake state, a deceleration rate tends to reduce. This leads to the problem of the occurrence of a poor deceleration feel.

It is, therefore, in view of the previously-described drawbacks of the prior art, an object of the invention to provide a braking force control device having a high deceleration control responsiveness and configured to avoid a poor deceleration feel that can be caused during a mode shift from an automatic brake mode to a manual brake mode and also to avoid an uncomfortable brake-pedal drawn-in feeling that can be caused during a mode shift from a manual brake mode to an automatic brake mode.

In order to accomplish the aforementioned and other objects, according to the present invention, there is provided a braking force control device for vehicles comprising a manual brake device, an automatic brake device, and a controller, the controller comprising an automatic-brake selective-actuation section configured to compare a braking force created by the manual brake device with a required braking force for the automatic brake device and to selectively actuate the automatic brake device when the required braking force exceeds in braking-force magnitude, a braking-force-difference time-rate-of-change calculation section configured to calculate a braking-force-difference time rate of change corresponding to a rate of change per unit time in a difference, which difference is obtained by subtracting the required braking force for the automatic brake device from the braking force created by the manual brake device, and a required braking force control section configured to correct the required braking force for the automatic brake device in a manner so as to reduce the required braking force when selectively actuating the automatic brake device and to correct a reducing amount of the required braking force in a manner so as to decrease the reducing amount as the calculated braking-force-difference time rate of change increases.

DESCRIPTION OF THE PREFERRED EMBODIMENTS

Therefore, according to the braking-force control device of the invention, a comparison between a braking force created by a manual brake device and a required braking force for an automatic brake device is made, and then the automatic brake device is selectively actuated when the required braking force exceeds in braking-force magnitude. That is, it is possible to selectively execute a brake mode having a higher one of the braking force created by the manual brake device and the required braking force for the automatic brake device. Therefore, even when the braking force created by the driver's manual brake is less than the braking force for the automatic brake, the automatic brake device comes into operation so as to achieve the required braking force, thus eliminating a poor deceleration feel.

Additionally, when the time rate of change in the braking force difference is great, a reducing amount of the required braking force for the automatic brake device can be reduced. Thus, it is possible to realize a more quick braking action by greatly enhancing the braking force created by the automatic brake device rather than the braking force created by the manual brake device, and also to alleviate an uncomfortable brake-pedal drawn-in feeling. Conversely when the time rate of change in the braking force difference is small, the reducing amount of the required braking force for the automatic brake device can be increased. Thus, it is possible to reasonably enhance the braking force created by the automatic brake device rather than the braking force created by the manual brake device, and also to more greatly alleviate an uncomfortable brake-pedal drawn-in feeling.

According to the braking force control device of the invention, on an automotive vehicle whose automatic brake device is equipped with an intelligent transport system (ITS), it is possible to prevent a collision with the preceding vehicle by generating a deceleration greater than the magnitude of braking force created by the driver's manual brake by virtue of the automatic brake device, and also to maintain a vehicle-to-vehicle distance between the preceding vehicle and the host vehicle at a predetermined distance.

The embodiments of this invention will become understood from the following description with reference to the accompanying drawings.

Figure 1:
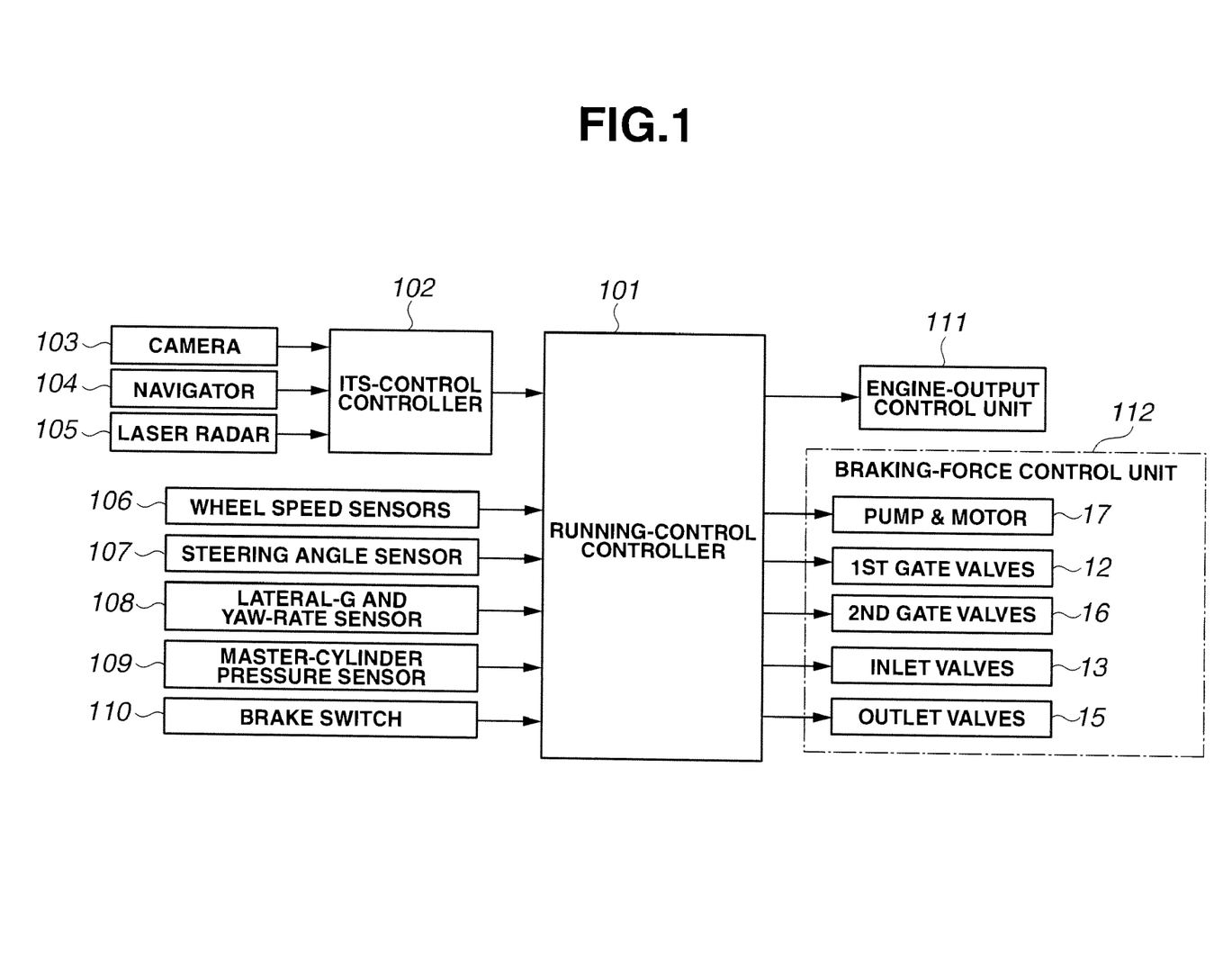
FIG. 1 is a block diagram illustrating a total system configuration of one embodiment of a braking force control device made according to the invention, the braking force control device connected to a hydraulic brake system and including a controller and various sensors.

FIG. 1 is a block diagram illustrating a total system configuration of one embodiment of a braking force control device made according to the invention, the braking force control device connected to a hydraulic brake system and including a controller and various sensors.

For instance, a running-control controller 101, configured to control an acceleration/deceleration of a vehicle, and an ITS-control controller 102, configured to calculate target running indexes (e.g., a target acceleration/deceleration and a target vehicle speed and the like) suited to an optimal road traffic, are constructed by a microcomputer, so as to execute a running-control process based on detected signals from various sensors, and to automatically accelerate or decelerate the vehicle depending on a vehicle running state by controlling operations of an engine-output control unit 111 and a braking-force control unit 112. For the reasons discussed above, the running-control controller 101 receives signals from ITS-control controller 102, electromagnetic-induction wheel speed sensors 106 for detecting wheel speeds Vwi (i=FL~RR) of respective road wheels, an optical non-contact steering angle sensor 107 for detecting a steering angle θ of a steering wheel, a lateral-G and yaw-rate sensor 108 for detecting a lateral gravity and yaw rate of the vehicle, a master-cylinder pressure sensor 109 for detecting a master-cylinder pressure mc_P, and a brake switch 110 for detecting a driver's brake-pedal depression.

Also, in order to calculate target running indexes (e.g., a target acceleration/deceleration and a target vehicle speed and the like), the ITS-control controller 102 receives signals from a white-lane-mark recognition means 103 such as a camera for recognizing a white line of a lane, a road-environment recognition means 104 such as a navigator for recognizing a road environment, and an object recognition means 105 such as a laser radar for recognizing a preceding vehicle or a frontally-located object ahead of the host vehicle. In this manner, a running environment and a running state of the host vehicle are read.

Figure 2:
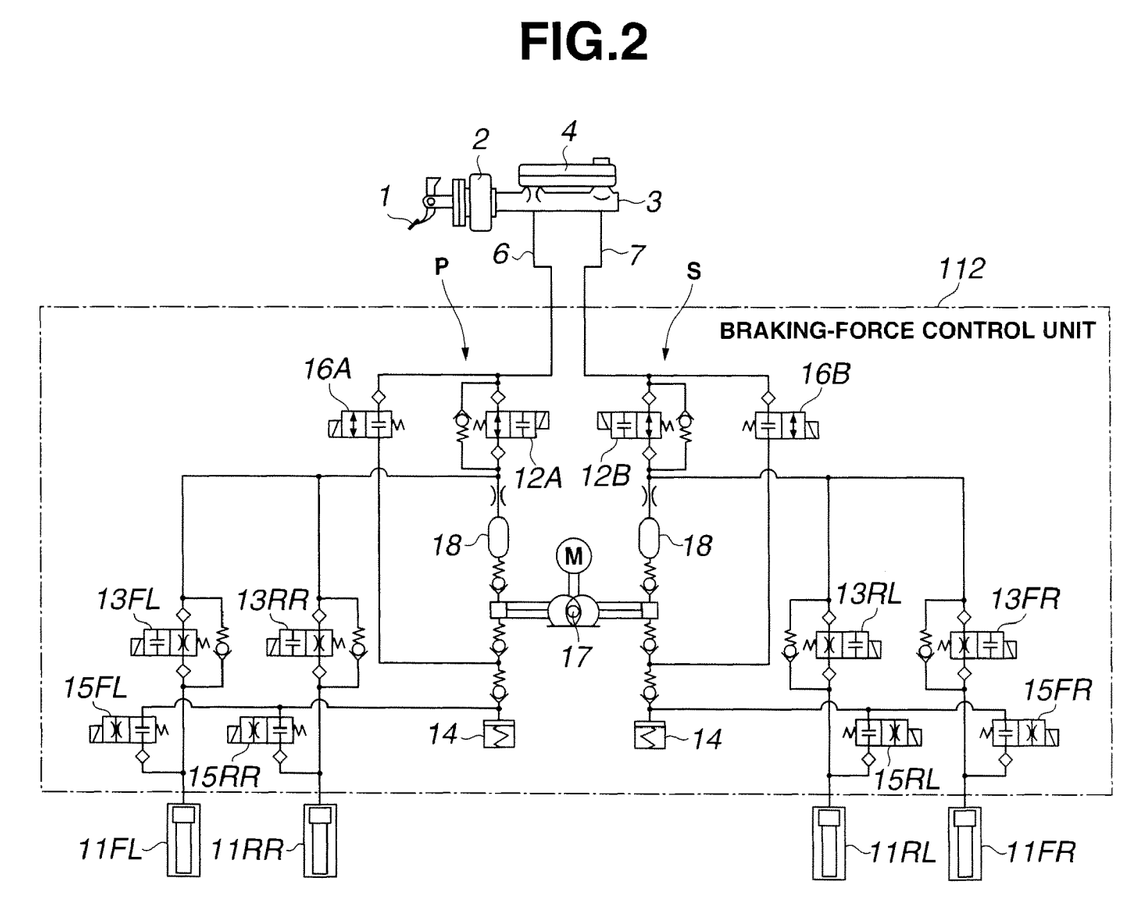
FIG. 2 is a schematic diagram illustrating the configuration of the braking-force control device.

FIG. 2 is a schematic diagram illustrating the configuration of the braking-force control device. As shown in FIG. 2, braking force control unit 112 is interleaved between a master cylinder 3 and each of wheel cylinders 11FL, 11FR, 11RL, and 11RR. Master cylinder 3 is a tandem master cylinder in which dual-brake-system fluid pressures are produced depending on a leg-power on the pedal, input from a brake pedal 1 depressed and operated by a driver's foot and multiplied by a working-fluid-pressure booster 2. Master cylinder 3 is equipped with a reservoir 4 for storing hydraulic brake fluid under atmospheric pressure, and for supplying hydraulic brake fluid from reservoir 4 to master cylinder 3. Braking-force control unit 112 adopts an X-split diagonal layout of brake circuits. Thus, the primary side P of master cylinder 3 is connected to front-left and rear-right wheel cylinders 11FL and 11RR. On the other hand, the secondary side S of master cylinder 3 is connected to front-right and rear-left wheel cylinders 11FR and 11RL.

Each of wheel cylinders 11FL~11RR is built in a disc brake in which a disk rotor can be sandwiched by brake pads under contact pressure to produce a braking force or a drum brake in which a brake shoe can be pushed against an inner peripheral surface of a brake drum to produce a braking force. Braking-force control unit 112 utilizes a hydraulic brake pressure control circuit, for use in an anti-skid braking system (ABS), a traction control system (TCS), a stability control or a vehicle dynamics control system (VDC), and the like. The braking-force control unit is configured to pressure-increase, hold, or decrease a fluid pressure in each individual wheel cylinder 11FL~11RR, regardless of the presence or absence of a driver's braking operation.

The brake circuit of the primary side P, connected to master cylinder 3 via a fluid-pressure line 6, is equipped with a normally-open first gate valve 12A capable of closing a fluid passage between master cylinder 3 and wheel cylinder 11FL (11RR), a normally-open inlet valve 13FL (13RR) capable of closing a fluid passage between first gate valve 12A and wheel cylinder 11FL (11RR), an accumulator 14 communicating with a fluid passage between wheel cylinder 11FL (11RR) and inlet valve 13FL (13RR), a normally-closed outlet valve 15FL (15RR) capable of opening a fluid passage between wheel cylinder 11FL (11RR) and accumulator 14, a normally-open second gate valve 16A capable of opening a communication passage intercommunicating a fluid passage between master cylinder 3 and first gate valve 12A and a fluid passage between accumulator 14 and outlet valve 15FL (15RR), and a pump-and-motor unit 17 whose suction side is communicated with the fluid passage between accumulator 14 and outlet valve 15FL (15RR) and whose discharge side is communicated with the fluid passage between second gate valve 16A and inlet valve 13FL (13RR). A damper chamber 18 is also provided on the discharge side of pump 17 for suppressing pulsations of the discharged hydraulic brake fluid and for weakening brake-pedal vibrations.

In a similar manner to the primary side P, the brake circuit of the secondary side S, connected to master cylinder 3 via a fluid-pressure line 7, is equipped with a first gate valve 12B, an inlet valve 13FR (13RL), an accumulator 14, an outlet valve 15FR (15RL), a second gate valve 16B, pump-and-motor unit 17, and a damper chamber 18. Each of first gate valves 12A, 12B, inlet valves 13FL~13RR, outlet valves 15FL~15RR, and second gate valves 16A, 16B is constructed by a two-port two-position switching, single solenoid, spring-offset electromagnetic-solenoid-operated valve. First gate valves 12A, 12H and inlet valves 13FL~13RR are configured to open their fluid passages at their de-energized normal positions, whereas outlet valves 15FL~15RR, and second gate valves 16A, 16B are configured to close their fluid passages at their de-energized normal positions.

Accumulator 14 is a spring-type accumulator in which a piston in a cylinder is preloaded with a compression spring at a side of the piston facing the spring end.

Pump-and-motor unit 17 is comprised of a displacement type pump, such as a gear pump or a piston pump, capable of assuring an approximately constant discharge regardless of load/pressure, and a DC motor.

The operation of the braking-force control device with the previously-noted arrangement is hereunder described in detail and exemplified on the primary side P. When first gate valve 12A, inlet valve 13FL (13RR), outlet valve 15FL (15RR), and second gate valve 16A are all kept at their de-energized normal positions, the fluid pressure from master cylinder 3 is directly transmitted or delivered into wheel cylinder 11FL (11RR), so that the associated road wheels are braked, thereby achieving a normal manual brake (a manual brake mode).

Even with brake pedal 1 kept at its inoperative state, by energizing the first gate valve 12A and keeping it closed, and by energizing the second gate valve 16A and keeping it opened, and additionally by driving pump-and-motor unit 17, while maintaining inlet valve 13FL (13RR) and outlet valve 15FL (15RR) at their de-energized normal positions, the fluid pressure in master cylinder 3 is drawn into the pump via second gate valve 16A, and then the fluid pressure discharged from the pump is transmitted via inlet valve 13FL (13RR) into wheel cylinder 11FL (11RR), so as to achieve a wheel-cylinder pressure increase (an automatic-brake pressure increase mode).

When inlet valve 13FL (13RR) is energized and closed with first gate valve 12A, outlet valve 15FL (15RR), and second gate valve 16A all kept at their de-energized normal positions, the fluid passage from wheel cylinder 11FL (11RR) to master cylinder 3 and accumulator 14 is blocked, so as to hold the fluid pressure in wheel cylinder 11FL (11RR) (an automatic-brake pressure fold mode).

Furthermore, when inlet valve 13FL (13RR) is energized and closed and outlet valve 15FL (15RR) is energized and opened with first gate valve 12A and second gate valve 16A kept at their de-energized normal positions, the fluid pressure in wheel cylinder 11FL (11RR) is flown into accumulator 14 with a pressure decrease in the wheel cylinder pressure. The fluid pressure, flown into accumulator 14, is drawn by pump-and-motor unit 17, and then returned back to master cylinder 3. Therefore, it is possible to decrease the fluid pressure in wheel cylinder 11FL (11RR) (an automatic-brake pressure decrease mode).

Regarding the secondary side S, the operation of a usual manual brake and the operation of an automatic brake by which a selected one of a fluid pressure increase, a fluid pressure hold, and a fluid pressure decrease is executable, are similar to those of the primary side P, and thus detailed description of the operations of the secondary side will be omitted because the above description thereon seems to be self-explanatory.

In this manner, running-control controller 101 is configured to increase, hold, or decrease the respective wheel cylinders 11FL~11RR by controlling operations of first gate valve 12A·12B, inlet valves 13FL~13RR, outlet valves 15FL~15RR, second gate valve 16A·16B, and pump-and-motor 17. That is, running-control controller 101 constructs an automatic brake means which is configured to obtain a fluid pressure from pump 17, and also to control braking forces of the road wheels based on a running environment and a running state of the host vehicle.

The shown embodiment adopts an X-split diagonal layout in which the hydraulic brake system is divided into brake circuits respectively associated with front-left and rear-right wheel cylinders 11FL·11RR and front-right and rear-left wheel cylinders 11FR·11RL. It will be appreciated that the invention is not limited to the particular embodiments shown and described herein, but that the concept of the invention may be applied to a front-and-rear parallel layout of brake circuits in which the hydraulic brake system is divided into brake circuits respectively associated with front-left and front-right wheel cylinders 11FL·11FR and rear-left and rear-right wheel cylinders 11RL·11RR.

Furthermore, the shown embodiment adopts a spring-type accumulator 14. It will be appreciated that the invention is not limited to the particular embodiments shown and described herein, but that the concept of the invention may be applied to any type of accumulators, such as a gas-compression straight-hydraulic type, a piston-type, a metal-bellows type, or a diaphragm type, by which hydraulic brake fluid relieved from the wheel cylinders 11FL~11RR can be temporarily stored and the wheel cylinder pressure decrease can be efficiently performed.

Moreover, the shown embodiment adopts a hydraulic system, which is configured so that a fluid passage is opened with first gate valve 12A·12B and inlet valves 13FL~13RR all kept at their de-energized normal positions, and that the fluid passage is closed with outlet valves 15FL~15RR and second gate valve 16A·16B all kept at their de-energized normal positions. It will be appreciated that the invention is not limited to the particular embodiments shown and described herein, but that the concept of the invention may be applied to another type of hydraulic system capable of opening and closing the respective valves. For instance, the invention may be applied to a system configuration in which a fluid passage is opened with first gate valve 12A·12B and inlet valves 13FL~13RR all kept at their energized offset positions, and the fluid passage is closed with outlet valves 15FL~15RR and second gate valve 16A·16B all kept at their energized offset positions.

Figure 3:
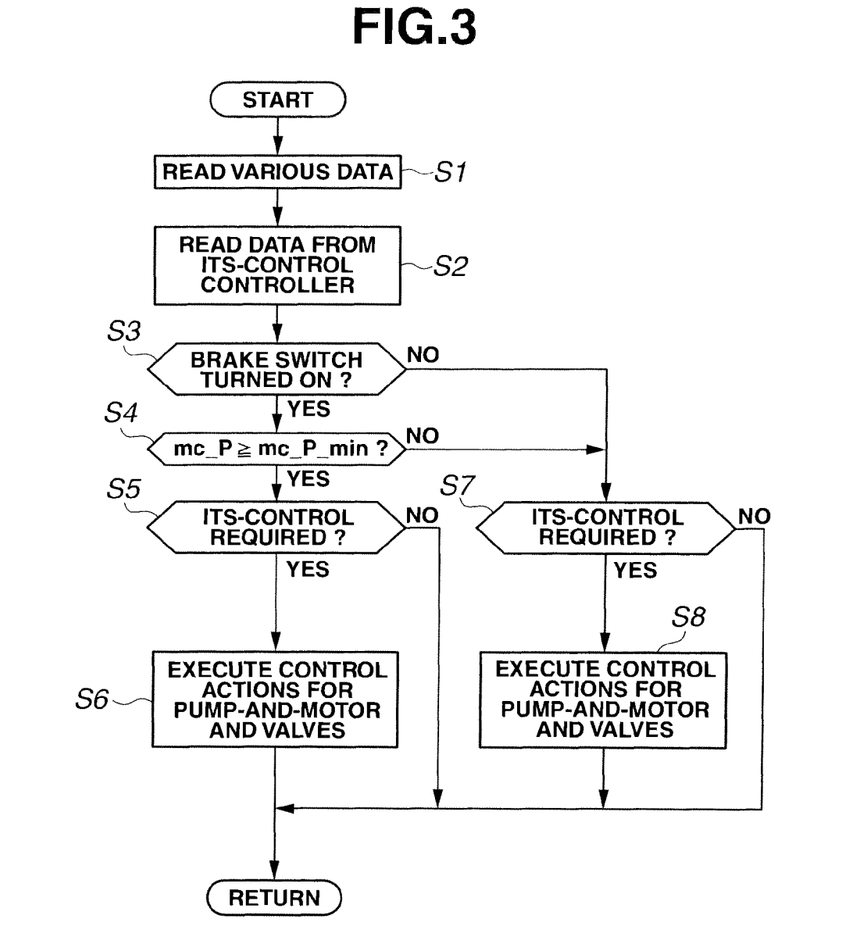
FIG. 3 is a flowchart illustrating a control routine executed by a running-control controller.

The control routine, executed by running-control controller 101, is hereunder described in detail in reference to the flowchart of FIG. 3. The control routine is executed as time-triggered interrupt routines to be triggered every predetermined time intervals such as 10 milliseconds. First, at step S1, informational data from various sensors and switches 106~110, (that is, each individual wheel speed $Vwi$ (I=FL~RR), steering angle $\theta$, lateral-G·yaw rate $Yg·\phi$, master-cylinder pressure $mc\_P$, and an ON/OFF signal value from a brake switch), are read. Next, at step S2, in order to realize the target running indexes determined based on a running environment and a running state of the host vehicle, data calculated by ITS-control controller 102 (that is, an ITS-control required value $mc\_ITS$ and an ITS-control required flag, both of which correspond to an ITS fluid-pressure required value), are read.

Then, at step S3, in order to determine whether or not the manual brake is actuated by the driver, a check is made to determine whether the brake switch is turned ON. When step S3 determines that the brake switch is turned ON, the routine proceeds to step S4. At step S4, a check is made to determine whether master-cylinder pressure $mc\_P$ is greater than or equal to a predetermined pressure $mc\_P\_min$. Hereupon, the predetermined pressure $mc\_P\_min$ may be set to a pressure level at which a clearance existing between the brake pad and the brake caliper becomes a zero clearance, (that is, at which a non-effective to effective transition of the fluid pressure occurs). Alternatively, the predetermined pressure may be set to a hydraulic brake pressure (e.g., 2 kgf/cm$^2$), which is determined, fully taking into account each sensor's operating characteristics of master-cylinder pressure sensor 109. By using or detecting both sensor signals from brake switch 110 and master-cylinder pressure sensor 109, a redundant system would result for enhanced reliability purposes of braking force control. When step S4 determines that master-cylinder pressure mc_P is greater than or equal to the predetermined pressure mc_P_min, the routine proceeds to step S5. At step S5, a check is made to determine whether a braking-force requirement from ITS-control controller 102 is present or absent. When step S5 determines that the braking-force requirement is absent, the current execution cycle of the control routine terminates, and thus braking-force control unit 112 operates to brake the road wheels by the usual manual brake means.

Conversely when step S5 determines that the braking-force requirement is present, the routine proceeds to step S6. At step S6, in a manner so as to selectively actuate the automatic brake device in response to a target fluid pressure Pm (described later) determined based on ITS-control required value mc_ITS and master-cylinder pressure mc_P, control actions for pump-and-motor unit 17 and respective valves 12, 13, 15, and 16 are executed.

Figure 4:
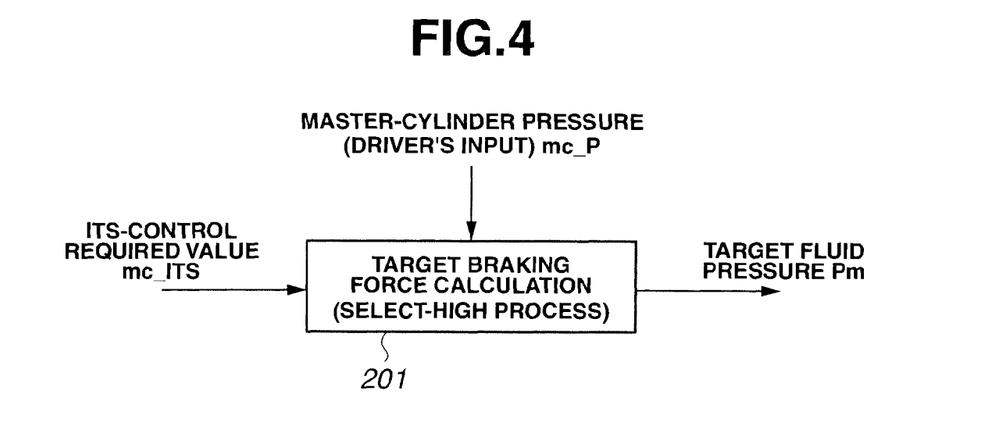
FIG. 4 is a diagram illustrating a select-HIGH process used to calculate a target fluid pressure determined based on a master-cylinder pressure and an ITS-control required value.

As best shown in FIG. 4, more concretely, at step S6, target fluid pressure Pm, required for execution of deceleration control, is calculated by a so-called select-HIGH process Pm=MAX(mc_ITS, mc_P) that ITS-control required value mc_ITS and master-cylinder pressure mc_P are compared to each other and then a higher one of them is selected. That is, in the case of ITS-control required value mc_ITS≧master-cylinder pressure mc_P, the target fluid pressure is set to the ITS-control required value, i.e., Pm=mc_ITS. In contrast, in the case of ITS-control required value mc_ITS<master-cylinder pressure mc_P, the target fluid pressure is set to the master-cylinder pressure, i.e., Pm=mc_P.

A front-wheel target braking force Fm_f and a rear-wheel target braking force Fm_r are calculated based on the target fluid pressure Pm calculated as discussed above, as follows.

$Fm\_f=Pm \times iK\_f$ $Fm\_r=Pm \times iK\_r$ where Fm_f denotes a front-wheel target braking force, Fm_r denotes a rear-wheel target braking force, Pm denotes a target fluid pressure, iK_f denotes a front-wheel braking-force conversion factor (a constant), and iK_r denotes a rear-wheel braking-force conversion factor (a constant).

In this manner, the current execution cycle of the control routine terminates. Therefore, step S6 corresponds to the automatic-brake selective-actuation section.

As an additional remark about step S6, generally, when the automatic brake comes into operation during operation of the driver's manual brake, the pump motor starts to rotate and thus hydraulic brake fluid is drawn from the master-cylinder side. Hence, there is a problem that a brake-pedal drawn-in phenomenon occurs.

That is, suppose that, an automatic brake comes into operation during braking of the road wheels by a driver's manual-brake operation and then a braking force created by the automatic brake exceeds a braking force created by the driver's manual brake (i.e., a pressure-increasing side of the automatic brake). In such a case, it is possible to achieve a greater deceleration with the braking force created by the automatic brake. Thus, it is possible to prevent a collision of the host vehicle with the preceding vehicle, and also to certainly maintain a vehicle-to-vehicle distance to the preceding vehicle at a given distance. However, in the shown embodiment, braking-force control unit 112 is constructed by a hydraulic-brake actuator equipped with pump-and-motor unit 17, and thus pump-and-motor unit 17 is rotated during operation of the automatic brake in such a manner as to draw hydraulic brake fluid from the side of master cylinder 3 and to force-feed the discharged hydraulic brake fluid to the side of wheel cylinder 11, and thus a braking force is produced. On this occasion, assuming that the driver's manual brake has already been actuated, a brake-pedal drawn-in phenomenon tends to occur in conjunction with a flow of hydraulic brake fluid drawn from the aide of master cylinder 3 into pump-and-motor unit 17, thus giving the driver an uncomfortable brake-pedal feel.

Therefore, when selectively actuating the automatic brake at step S6, the motor speed of motor 17 is set to a relatively lower value as compared to a necessary actuation of the automatic brake executed at step S8 (described later), and whereby it is possible to reduce a brake-pedal drawn-in phenomenon. Additionally in the presence of execution of the driver's manual brake, the hydraulic brake pressure in the wheel cylinder becomes higher as compared to the absence of the manual brake, and thus it is possible to ensure an acceptable control responsiveness even when the motor speed is set to a lower value, thus suppressing an unnecessary motor-speed rise, and thereby suppressing a brush wear and a deteriorated pump-seal life, and also improving deteriorated noise/vibration properties, which may occur due to high-speed setting of the motor.

Furthermore, when the manual brake is actuated by the driver, the fluid pressure in master cylinder 3 becomes higher, as compared to an inoperative state of the manual brake, and thus it is possible to ensure an acceptable control responsiveness even when the motor speed is set to a lower value, thus suppressing an unnecessary motor-speed rise, and thereby suppressing a brush wear of pump-and-motor unit 17 and a deteriorated pump-seal life, and also improving deteriorated noise/vibration properties, which may occur due to high-speed setting of the motor.

The above rule, however, does not apply to the case that ITS-control required value mc_ITS becomes less than master-cylinder pressure mc_P after ITS-control required value mc_ITS has exceeded master-cylinder pressure mc_P (i.e., a pressure-decreasing side of the automatic brake).

Figure 5:
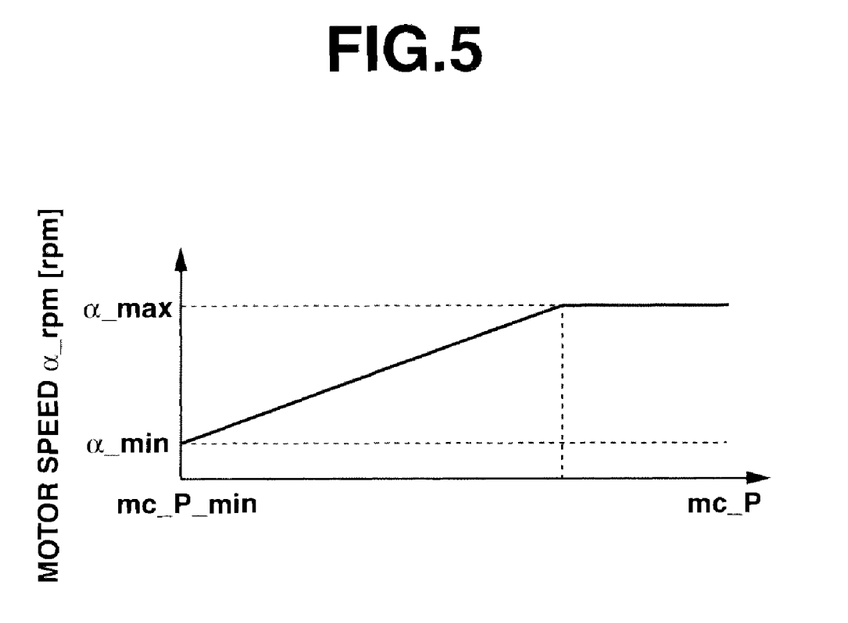
FIG. 5 is a reference diagram used to set a motor speed.

Preferably, when selectively actuating the automatic brake at step S6, as shown in FIG. 5, a motor speed α_rpm is set to a higher value, as master-cylinder pressure mc_P increases. Motor speed α_rpm can be selected between a minimum motor speed α_min and a maximum motor speed α_max, depending on mater-cylinder pressure mc_P (i.e., α_min≦α_rpm≦α_max). Herein, the motor speed is determined continuously depending on a change in mater-cylinder pressure mc_P. However, owing to fluctuations in motor speed α_rpm, arising from fluctuations in mater-cylinder pressure mc_P, there is a possibility of deteriorated noise/vibration properties such as a tone-quality change. In lieu thereof, two-stage or three-stage motor speed maps may be used and preprogrammed depending on master-cylinder pressure mc_P, so that the motor speed can be determined by properly switching the preprogrammed motor speed maps depending on the master-cylinder pressure. Hereby, it is possible, on the one hand, to achieve a more rapid deceleration. On the other hand, regarding a brake-pedal drawn-in phenomenon, it is possible to reduce an uncomfortable pedal drawn-in feeling because of a heavy driver's brake-pedal depression even in the case of setting of the motor speed to a higher value in accordance with a master-cylinder pressure increase. Thus, it is possible to reconcile these two contradictory functional effects.

Figure 6:
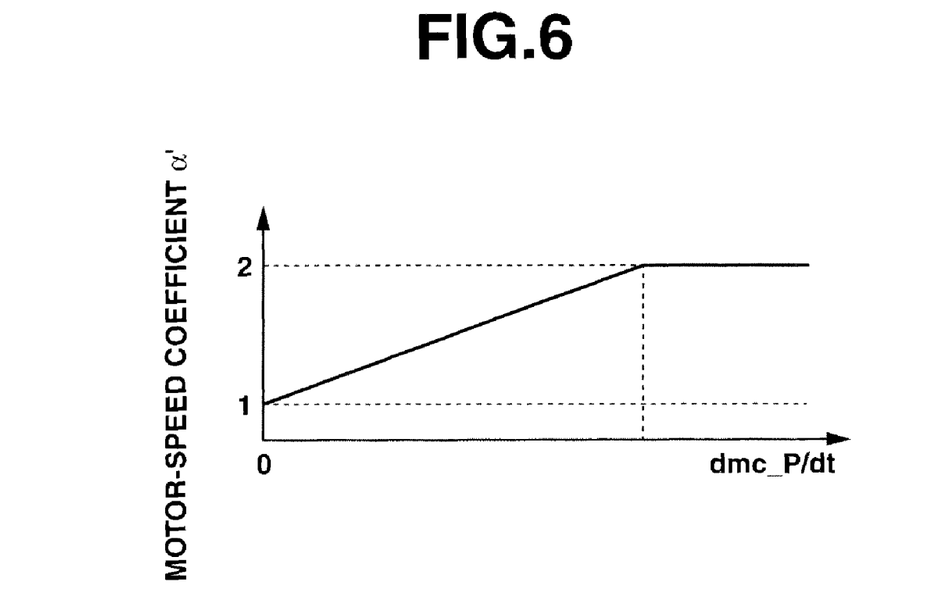
FIG. 6 is a reference diagram used to set a motor-speed coefficient.

More preferably, when selectively actuating the automatic brake at step S6, as exemplified in FIG. 6, a motor-speed coefficient $\alpha'$ is set to a higher value, as a time-rate-of-increase dmc_P/dt in master-cylinder pressure mc_P increases, on the assumption that a direction for depressing the brake pedal is positive. Hereupon, motor speed $\alpha$_rpm is calculated from the following formula.

$$\alpha\_rpm = \alpha\_rpm \times \alpha' (1 \leq \alpha' \leq 2)$$

Hereby, it is possible, on the one hand, to achieve a more rapid deceleration. On the other hand, regarding a drawn-in phenomenon of brake pedal 1, it is possible to reduce an uncomfortable pedal drawn-in feeling because of a heavy driver's brake-pedal depression even in the case of setting of the motor speed to a higher value in accordance with a master-cylinder pressure increase. Thus, it is possible to reconcile the contradictory functional effects. Herein, the motor speed is obtained by multiplying motor-speed coefficient $\alpha'$. In lieu thereof, motor-speed coefficient $\alpha'$ may be set within a speed range from 0 rpm to 2000 rpm, and motor-speed coefficient $\alpha'$ may be determined, depending on a time-rate-of-increase dmc_P/dt in master-cylinder pressure mc_P, from a preprogrammed dmc_P/dt–$\alpha'$ map, and then motor speed $\alpha$_rpm may be calculated from the following formula.

$$\alpha\_rpm = \alpha\_rpm + \alpha' (0\ rpm \leq \alpha' \leq 2000\ rpm)$$

Furthermore, instead of using the current value of time-rate-of-increase dmc_P/dt in master-cylinder pressure, several previous values of time-rate-of-increase dmc_P/dt may be sampled and the sampled previous values may be subjected to equalization processing, and then motor-speed coefficient $\alpha'$ may be determined, based on the equalized time-rate-of-increase dmc_P/dt, from a preprogrammed equalized time-rate-of-increase dmc_P/dt versus motor-speed coefficient $\alpha'$ map, and then motor speed $\alpha$_rpm may be calculated based on the determined motor-speed coefficient.

Also, in the presence of a rise in time-rate-of-increase dmc_P/dt due to a further pedal depression of the driver's manual brake, the driver has his/her intention of preventing a collision by virtue of a rapid deceleration and of maintaining a vehicle-to-vehicle distance to the preceding vehicle at a given distance. Hence, it is possible to enhance a functional effect that a more rapid deceleration can be realized by increasing the motor speed when the automatic brake comes into operation. On the other hand, regarding a brake-pedal drawn-in phenomenon, it is possible to reduce an uncomfortable pedal drawn-in feeling because of a heavy driver's brake-pedal depression even in the case of setting of the motor speed to a higher value in accordance with a master-cylinder pressure increase. Thus, it is possible to reconcile the contradictory functional effects.

Figure 7:
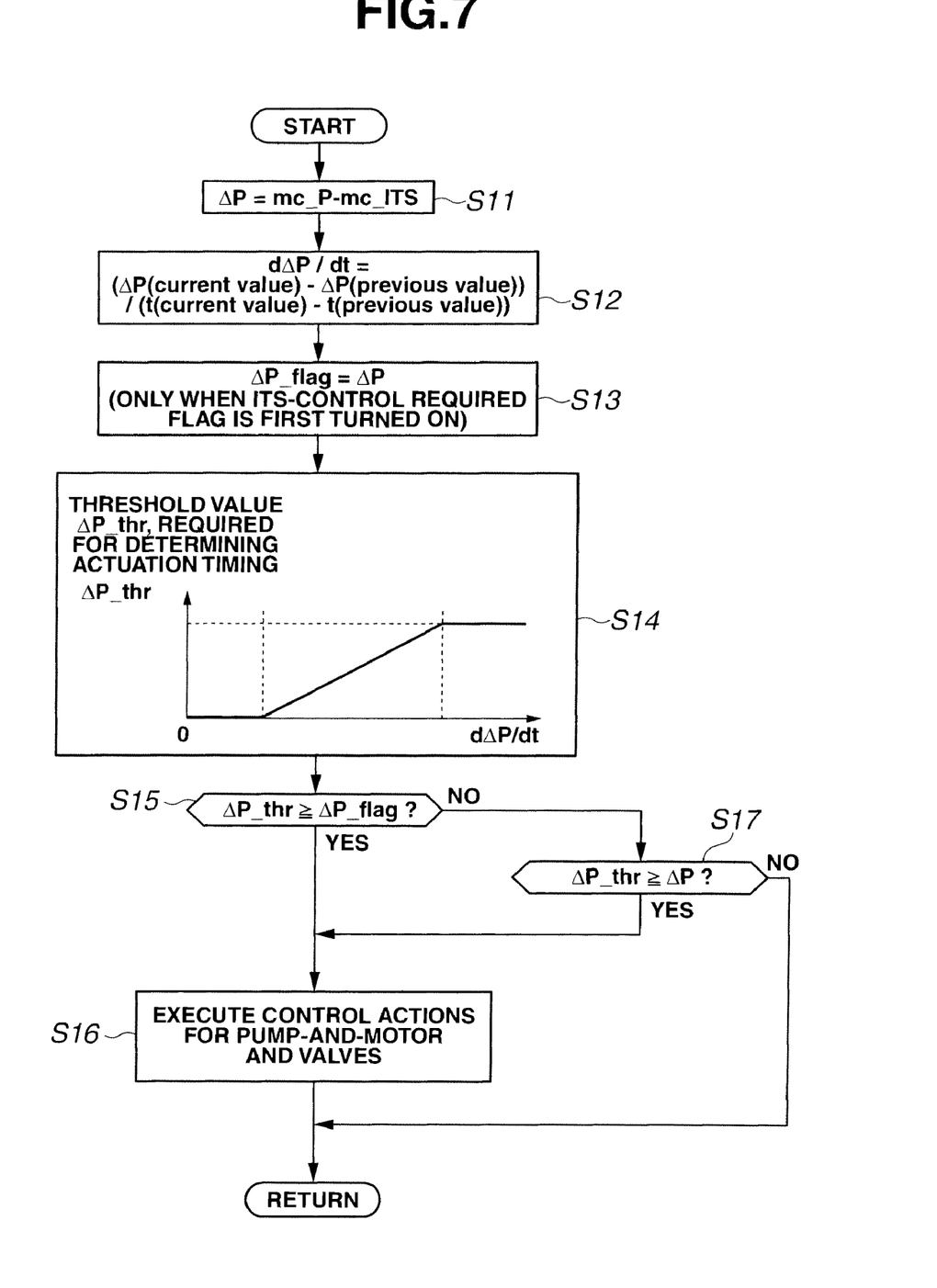
FIG. 7 is a flowchart used to determine actuation timing of a pump-and-motor unit and second gate valves.

As a more additional remark about step S6, when operating pump-and-motor unit 17 and respective valves 12, 13, 15, and 16 at step S6, the detailed procedure regarding which timing these fluid-pressure control devices should come into operation at, is hereunder described in reference to the flowchart of FIG. 7. At step S11, a difference $\Delta P$ (=mc_P−mc_ITS) between master-cylinder pressure mc_P and ITS-control required value mc_ITS is calculated. At step S12, a time rate of change d$\Delta P$/dt in the above-mentioned difference $\Delta P$ is calculated. Instead of using the current value of time rate of change d$\Delta P$/dt, several previous values of time rate of change d$\Delta P$/dt may be sampled and the equalization-processed time rate of change may be calculated and used.

At step S13, the difference $\Delta P$, calculated at the point of time when a transition of an ITS-control required flag to an ON state first occurs, is set to a reference value $\Delta P$_flag. Then, the routine proceeds to step S14. At step S14, a threshold value $\Delta P$_thr is determined based on the time rate of change d$\Delta P$/dt, calculated through step S12 from a reference characteristic diagram indicated within step S14 of FIG. 7. The exemplified characteristic diagram is preprogrammed so that threshold value $\Delta P$_thr, required for determining actuation timing of pump-and-motor unit 17 and second gate valve 16A·16B, increases, as time rate of change d$\Delta P$/dt increases.

At step S15, reference value $\Delta P$_flag, calculated at step S13 is compared to threshold value $\Delta P$_thr, calculated at step S14, and then a check is made to determine whether the calculated threshold value is greater than or equal to the calculated reference value. When $\Delta P$_thr$\geq \Delta P$_flag, the routine proceeds to step S16. At step S16, control actions for pump-and-motor unit 17 and respective valves 12, 13, 15, and 16 are executed. Conversely when step S15 determines that the calculated threshold value is less than the calculated reference value, that is, $\Delta P$_thr<$\Delta P$_flag, the routine proceeds to step S17.

At step S17, a check is made to determine whether the calculated threshold value is greater than or equal to the calculated difference. When $\Delta P$_thr$\geq \Delta P$, the routine proceeds to step S16, so as to execute control actions for pump-and-motor unit 17 and respective valves 12, 13, 15, and 16. Conversely when $\Delta P$_thr<$\Delta P$, the current execution cycle of the control routine terminates without executing control actions for pump-and-motor unit 17 and respective valves 12, 13, 15, and 16.

According to the characteristic diagram of the embodiment, as exemplified in FIG. 7, when the time rate of change d$\Delta P$/dt becomes small, the threshold value $\Delta P$_thr, required for determining actuation timing, also becomes small (see step S14 of FIG. 7). Thus, in the case of such a small time rate of change, according to the routine of FIG. 7, the flow defined by S11→S12→S13→S14→S15→S17→S11 is repeatedly executed. As a result of this, pump-and-motor unit 17 and second gate valve 16A·16B do not operate until a point of time nearer to the time when ITS-control required value mc_ITS begins to exceed master-cylinder pressure mc_P. In contrast, when the time rate of change d$\Delta P$/dt becomes great, the threshold value $\Delta P$_thr, required for determining actuation timing, also becomes great. Thus, in the case of such a great time rate of change, according to the routine of FIG. 7, the flow defined by S11→S12→S13→S14→S15→S16 occurs. As a result of this, pump-and-motor unit 17 and second gate valve 16A·16B begin to operate near a point of time when the ITS-control required flag becomes shifted to its ON state. Hereby, in the case that a quick deceleration is necessary, it is possible to ensure a pressure-rise responsiveness by operating pump-and-motor unit 17 and second gate valve 16A·16B at an earlier time. Conversely in the case that a quick deceleration is unnecessary, it is possible to improve a deteriorated durability and deteriorated noise/vibration properties, which may occur owing to unnecessary actuations of fluid-pressure control devices (17, 16A·16B), and also to eliminate an uncomfortable pedal drawn-in feeling.

In the case that pump-and-motor unit 17 comes into operation when a braking force created by the automatic brake, which corresponds to ITS-control required value mc_ITS, exceeds a braking force created by the driver's manual brake, which corresponds to mater-cylinder pressure mc_P, there is a possibility of a delay in the pressure-rise responsiveness, even though the driver expects an immediate deceleration. In contrast, according to the flowchart of FIG. 7, actuation timing of pump-and-motor unit 17 and second gate valve 16A·16B can be suitably determined and controlled, and thus it is possible to reconcile the previously-described two contradictory requirements.

Therefore, the above-mentioned step S16 corresponds to a required braking force control means.

Returning to step S3, conversely when step S3 determines that the brake switch is turned OFF, the routine proceeds to step S7. At step S7, a check is made to determine whether a braking-force requirement from ITS-control controller 102 is present or absent. When step S7 determines that the braking-force requirement is present, the routine proceeds to step S8, so as to necessarily actuate the automatic brake device. That is, at step S8, in response to ITS-control required value mc_ITS, control actions for pump-and-motor unit 17 and respective valves 12, 13, 15, and 16 are executed. In this manner, the current execution cycle of the control routine terminates.

Figure 8:
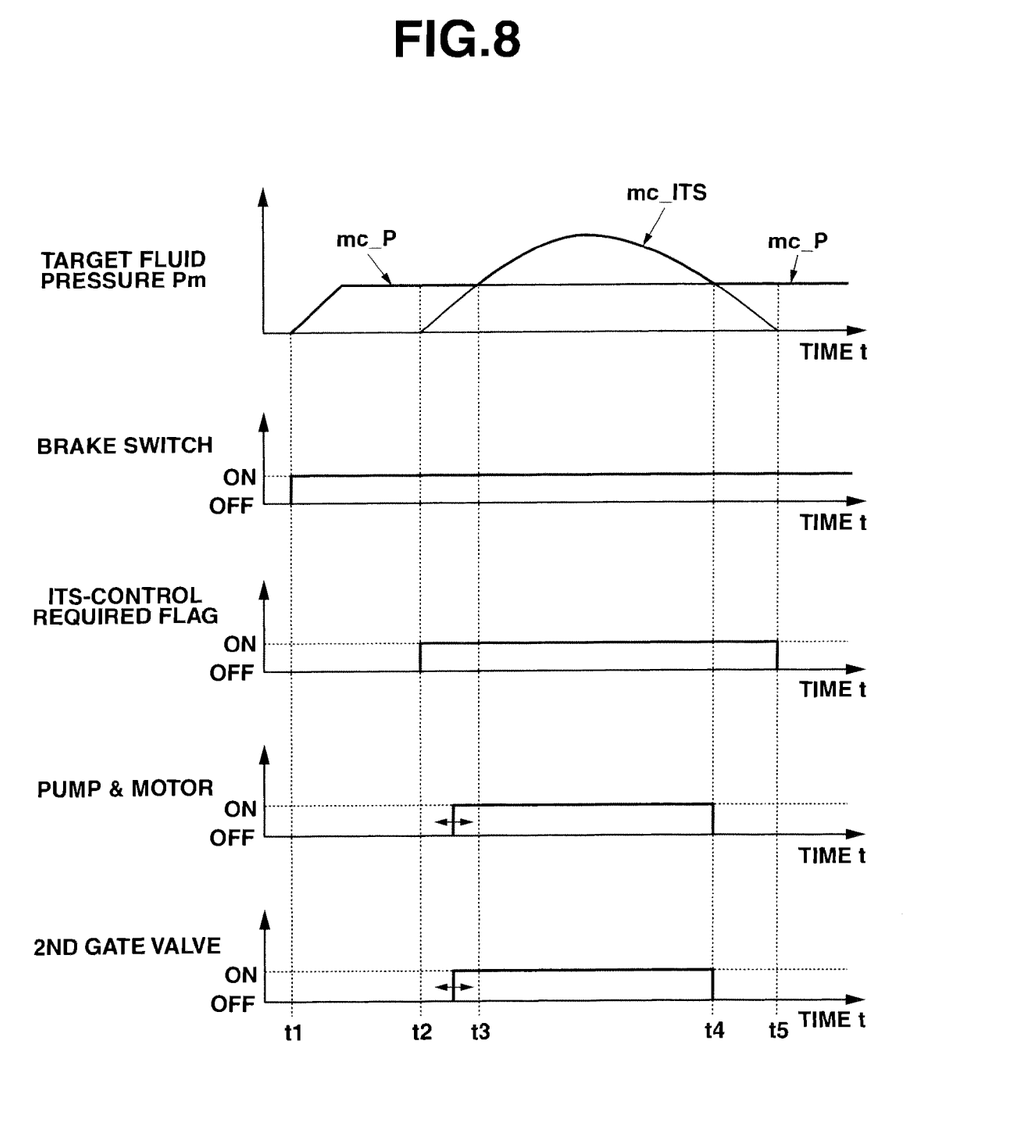
FIG. 8 shows time charts illustrating variations in a master-cylinder pressure, an ITS-control required value, a target fluid pressure, a brake-switch signal, and an ITS-control required flag, and operations of the pump-and-motor unit and the second gate valves.

Time charts illustrated in FIG. 8, show variations in master-cylinder pressure mc_P, ITS-control required value mc_ITS, a signal from brake switch 110, a state of the ITS-control required flag, and operations of pump-and-motor unit 17 and second gate valve 16. For instance, assume that the brake switch is turned ON at the time t1, and master-cylinder pressure mc_P is outputted after the time t1, and then master-cylinder pressure mc_P is fixed to a constant pressure value. Thereafter, assume that the ITS-control required flag is shifted to an ON state at the time t2, and ITS-control required value mc_ITS is outputted after the time t2, and in the former half ITS-control required value mc_ITS tends to increase and thereafter the ITS-control required value begins to decrease and thus returns to "0".

After the time t3, ITS-control required value mc_ITS exceeds mater-cylinder pressure mc_P. After this, ITS-control required value mc_ITS reaches a maximum value and then begins to decrease. Thereafter, ITS-control required value mc_ITS becomes less than mater-cylinder pressure mc_P from the time t4. Then, ITS-control required value mc_ITS becomes "0" at the time t5.

In this case, by virtue of step S6, target fluid pressure Pm can be indicated as a compound curve obtained by combining higher thick-line sections of two different thick lines indicating the two fluid-pressure characteristics indicated in the uppermost time chart of FIG. 8. Pump-and-motor unit 17 becomes activated (ON) and second gate valve 16 becomes activated (ON) at a certain point of time existing within a time interval between the time t2 and the time t3, during which interval ITS-control required value mc_ITS is increasing from "0", so as to prepare for automatic-brake selective actuation executed after the time t3. The actuation timing of the fluid-pressure control devices of the automatic brake tends to vary as indicated by the arrows in FIG. 8. The detailed actuation-timing decision rule regarding which timing within the time interval between the time t2 and the time t3 pump-and-motor unit 17 and second gate valve 16 should come into operation at, is based on the previously-discussed flowchart of FIG. 7. According to the exemplified flowchart of FIG. 7, the point of time t3 when ITS-control required value mc_ITS exceeds master-cylinder pressure mc_P serves as a basing point, and the automatic brake control system is configured to operate pump-and-motor unit 17 and second gate valve 16A·16B from a certain time before the basing point. In lieu thereof, the point of time t2 when the ITS-control required flag becomes shifted to an ON state may serve as a basing point. In such a case, the automatic brake control system may be configured so that actuation timing is delayed, as a time rate of change dΔP/dt in the above-mentioned difference ΔP decreases.

Thereafter, at the time t4 when ITS-control required value mc_ITS becomes less than master-cylinder pressure mc_P, pump-and-motor unit 17 becomes deactivated (OFF) and simultaneously second gate valve 16 becomes deactivated (OFF).

The braking-force control device of the present embodiment employs a manual brake device configured to be connected to braking-force control unit 112 serving as a hydraulic brake system by which braking forces are applied to road wheels and also configured to brake the road wheels in response to master-cylinder pressure mc_P created with brake pedal 1 depressed and operated by a driver's foot, and an automatic brake device configured to obtain a fluid pressure from pump 17, and also to control braking forces applied to the road wheels based on ITS-control required value mc_ITS calculated by ITS-control controller 102 by which controller a running environment and a running state of the host vehicle are read in.

Furthermore, master-cylinder pressure mc_P, created by the manual brake device, and ITS-control required value mc_ITS, inputted into the automatic brake device, are compared to each other. When ITS-control required value mc_ITS is greater than or equal to the master-cylinder pressure, it is possible to generate a deceleration greater than the magnitude of braking force created by the driver's manual brake, by virtue of a select-HIGH process that the automatic brake device can be selectively actuated.

According to the embodiment as discussed above, it is possible to avoid a poor deceleration feeling, and also to prevent a collision with the preceding vehicle, and further to reduce a collisional velocity, by virtue of the select-HIGH process. Moreover, it is possible to more certainly maintain a vehicle-to-vehicle distance to the preceding vehicle at a predetermined distance.

Figure 9:
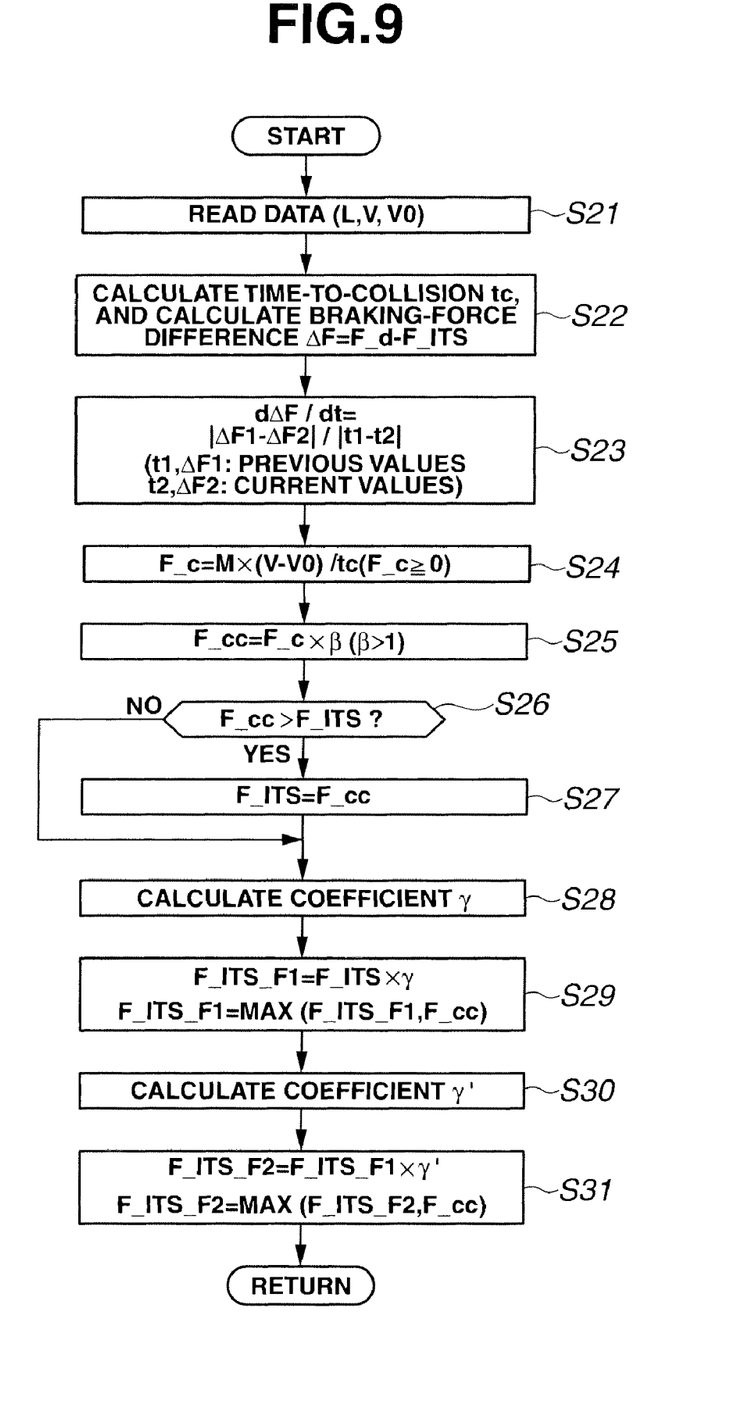
FIG. 9 is a flowchart illustrating a control routine further executed by the running-control controller.

FIG. 9 is a flowchart illustrating a control routine further executed by running-control controller 101 of the embodiment. The control routine is executed as time-triggered interrupt routines to be triggered every predetermined time intervals such as 10 milliseconds. First, at step S21, a vehicle speed V of a host vehicle is read in from wheel speed sensors 106, whereas a distance L from the host vehicle to a preceding vehicle and a velocity V0 of the preceding vehicle are read in from ITS-control controller 102. ITS-control controller 102 is configured to recognize the preceding vehicle by a signal from object recognition means 105, and to measure the relative distance L from the host vehicle to the preceding vehicle, and further configured to calculate a velocity V0 of the preceding vehicle based on a time rate of change dL/dt in the relative distance L and the host vehicle speed V.

Figure 10:
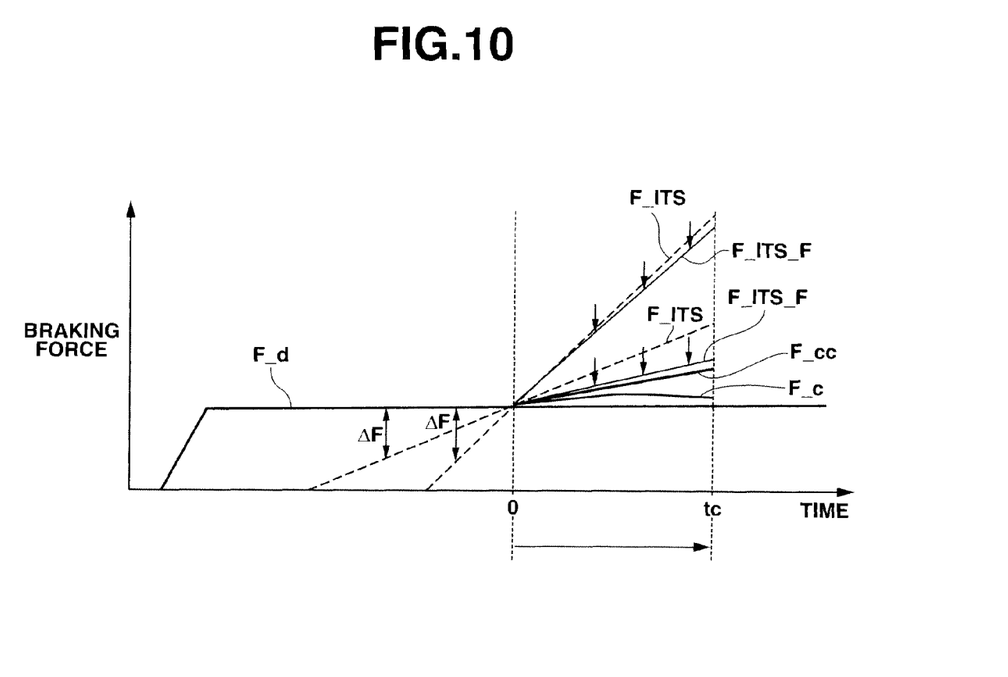
FIG. 10 is a time chart illustrating a manual-brake braking force and an automatic-brake required braking force.

At step S22, as shown in FIG. 10, a time-to-collision tc{=L/(V−V0)} that the host vehicle is brought into collision with the preceding vehicle with no braking action, is calculated based on the relative velocity (V−V0) between the host vehicle and the preceding vehicle, obtained by the host vehicle speed V and the preceding vehicle speed V0, and the relative distance L of the preceding vehicle to the host vehicle. Additionally, a braking-force difference ΔF (=F_d−F_ITS) is obtained by subtracting a required braking force F_ITS for the automatic brake from a braking force F_d created by the manual brake. At step S23, a time rate of change dΔF/dt (=|ΔF1−ΔF2|/|t1−t2|) in the braking-force difference is calculated, where the braking-force difference ΔF1 and the time t1 represent the previous values, and the braking-force difference ΔF2 and the time t2 represent the current values. In this embodiment, braking force F_d created by the manual brake is kept constant, and thus the time rate of change dΔF/dt in the braking-force difference can be regarded as a gradient of the tangent of the curve representing a change in required braking force F_ITS. Therefore, step S22 corresponds to a time-to-collision calculation means, whereas step S23 corresponds to a braking-force-difference time-rate-of-change calculation means.

At step S24, a braking force, based on the above-mentioned time-to-collision tc and required for braking action with a constant braking force until the relative distance L between the preceding vehicle and the host vehicle reaches "0", namely, a basic braking force F_c (=M×(V−V0)/tc), is calculated, where M denotes a vehicle weight of the host vehicle, and the basic braking force is not negative, i.e., F_c≧0. Thus, step S24 corresponds to a basic braking force calculation means.

By the way, assuming that the brakes are applied with the basic braking force F_c, the host vehicle is brought into collision with the preceding vehicle, with a zero relative distance. For this reason, at step S25, by multiplying the basic braking force F_c with a first braking-force coefficient β (β>1), a collisionless braking force F_cc (=F_c×β), which a collision does not occur, is calculated.

At step S26, collisionless braking force F_cc and required braking force F_ITS for the automatic brake are compared to each other. When collisionless braking force F_cc exceeds in braking-force magnitude (i.e., F_cc>F_ITS), the routine proceeds to step S27 at which, by a so-called select-HIGH process, required braking force F_ITS for the automatic brake is set to be equal to collisionless braking force F_cc. That is, F_ITS=MAX(F_ITS, F_cc). Hereby, a collision with the preceding vehicle can be prevented, thus enhancing a safety of the vehicle.

That is, in the case that the braking force created by the automatic brake is less than the braking force required until the relative distance reaches "0" with a constant braking force, the host vehicle would be brought into collision with the preceding vehicle even when the braking force created by the automatic brake is greater than the braking force created by the driver's manual brake. In contrast, according to the present embodiment, it is possible to prevent a collision with the preceding vehicle by the select-HIGH process F_ITS=MAX(F_ITS, F_cc), thus enhancing a safety of the vehicle. As the aforementioned automatic brake, an automatic brake concluded with a group of sensors, or an automatic brake employing a navigator may be included.

Conversely when collisionless braking force F_cc is less than or equal to required braking force F_ITS for the automatic brake, the routine skips step S27 and thus required braking force F_ITS just goes through.

Figure 11:
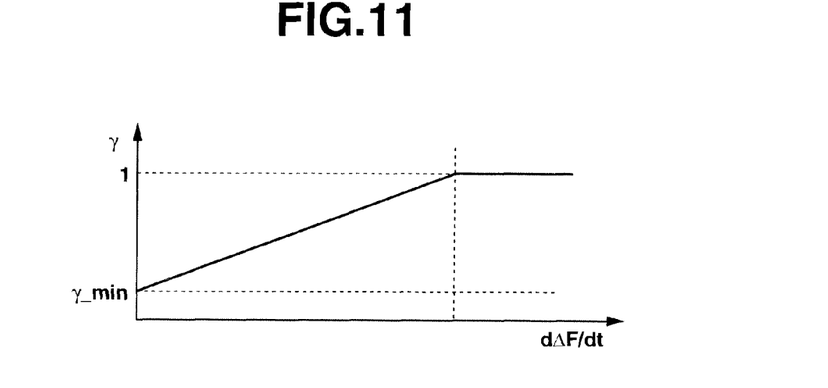
FIG. 11 is a reference diagram used to set a second braking-force coefficient γ.

At step S28, a second braking-force coefficient γ is calculated and derived from the time rate of change dΔF/dt in the braking-force difference, calculated at step S23, in reference to the relational diagram shown in FIG. 11. Instead of using the current value of the time rate of change in the braking-force difference, several previous values of time-rate-of-change dΔF/dt may be sampled and the sampled previous values may be subjected to equalization processing, and then the second braking-force coefficient may be calculated, based on the equalized time-rate-of-change. As seen from the relational diagram, the second braking-force coefficient γ increases from a minimum value γ_min, as the time-rate-of-change dΔF/dt increases, and then reaches "1" at a maximum (i.e., γ≦1). At step S29, a required braking force F_ITS_F1, which is reduced by multiplying required braking force F_ITS, outputted from ITS-control controller 102, with the second braking-force coefficient γ, is calculated (F_ITS_F1=F_ITS×γ). However, in order to ensure a collision-prevention function, a select-HIGH process F_ITS_F1=MAX(F_ITS_F1, F_cc) is made to the reduced required braking force F_ITS_F1.

Hereby, when the time rate of change dΔF/dt in the braking-force difference is great, a reducing amount of required braking force F_ITS for the automatic brake can be decreased, and whereby it is possible to realize a more quick braking action by greatly enhancing the braking force created by the automatic brake rather than the braking force created by the manual brake, and also to alleviate an uncomfortable brake-pedal drawn-in feeling. Conversely when the time rate of change dΔF/dt in the braking-force difference is small, the reducing amount of required braking force F_ITS for the automatic brake can be increased, and whereby it is possible to reasonably enhance the braking force created by the automatic brake rather than the braking force created by the manual brake, and also to more greatly alleviate an uncomfortable brake-pedal drawn-in feeling.

Figure 12:
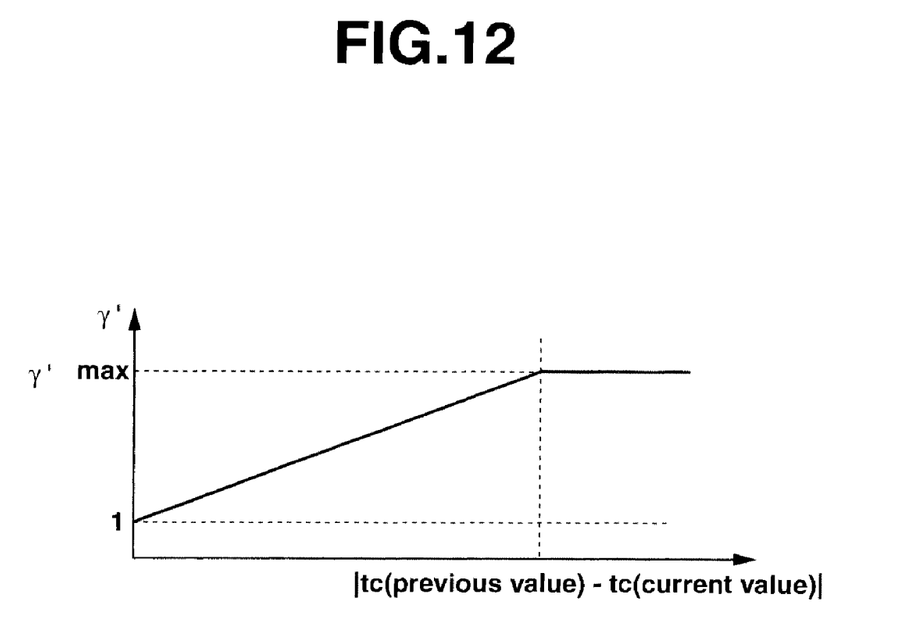
FIG. 12 is a reference diagram used to set a third braking-force coefficient γ'.

At a subsequent step S30, a third braking-force coefficient γ' is calculated and derived from an absolute value (|tc(previous value)−tc(current value)|) of the difference between the previous value and the current value of time-to-collision tc, calculated at step S22, in other words, a time rate of change Δtc in time-to-collision tc, in reference to the relational diagram shown in FIG. 12. As seen from the relational diagram, the third braking-force coefficient γ' increases from "1", as the absolute value |tc(previous value)−tc(current value)| increases, and then reaches a maximum value γ'max (i.e., 1≦γ'). Thereafter, at step S31, a final required braking force F_ITS_F2 for the automatic brake is calculated and obtained by multiplying the reduced required braking force F_ITS_F1, calculated through step S29, with the third braking-force coefficient γ' (F_ITS_F2=F_ITS_F1×γ'). However, in order to ensure a collision-prevention function, a select-HIGH process F_ITS_F2=MAX(F_ITS_F2, F_cc) is made to the final required braking force F_ITS_F2.

Hereby, even when time-to-collision tc that the host vehicle is brought into collision with the preceding vehicle has shortened due a sudden deceleration of the preceding vehicle and a sudden entry of another preceding vehicle between the preceding vehicle and the host vehicle, it is possible to avoid a collision by enhancing the braking force created by the automatic brake, and also to alleviate an uncomfortable brake-pedal drawn-in feeling.

While the foregoing is a description of the preferred embodiments carried out the invention, it will be understood that the invention is not limited to the particular embodiments shown and described herein, but that various changes and modifications may be made without departing from the scope or spirit of this invention. The deceleration-control system configurations peculiar to the present invention, respectively shown in FIGS. 3-7, may be combined with each other suitably by choice. Furthermore, by properly designing the threshold value, a plurality of contradictory requirements, that is, a reduction in uncomfortable drawn-in feeling of brake pedal 1, a deterioration in the durability of braking-force control unit 112, an improvement of deteriorated noise/vibration properties, and a superior pressure-rise responsiveness, may be optimized and balanced.

What is claimed is:

1. A braking force control device for a vehicle, the braking force control device being configured to interact with a hydraulic brake system, and the braking force control device comprising:

a manual brake device configured to brake road wheels of the vehicle in response to a driver's operation;

an automatic brake device configured to obtain a fluid pressure from a pump and to control braking forces applied to the road wheels based on a running environment and a running state of the vehicle; and a controller configured to be connected to the manual brake device and the automatic brake device for deceleration control, the controller comprising:

an automatic-brake selective-actuation section configured to compare a manual braking force created by the manual brake device with a required braking force for the automatic brake device and to selectively actuate the automatic brake device when the required braking force exceeds the manual braking force;

a braking-force-difference time-rate-of-change calculation section configured to calculate a braking-force-difference time-rate-of-change corresponding to a rate of change per unit time in a difference, which difference is obtained by subtracting the required braking force for the automatic brake device from the manual braking force created by the manual brake device; and a required braking force control section configured to correct the required braking force for the automatic brake device to reduce the required braking force when selectively actuating the automatic brake device and to correct a reducing amount of the required braking force to decrease the reducing amount of the required braking force as the calculated braking-force-difference time-rate-of-change increases.

2. The braking force control device as claimed in claim 1, wherein:

the controller further comprises:

an object recognition section configured to recognize a frontally-located object ahead of the vehicle and to detect a relative velocity between the object and the vehicle;

a time-to-collision calculation section configured to calculate, based on the relative velocity between the object and the vehicle, a time-to-collision that the vehicle is brought into collision with the object with no braking action; and a basic braking force calculation section configured to calculate a basic braking force based on the time-to-collision, the basic braking force corresponding to a braking force required for braking action with a constant braking force until a relative distance between the object and the vehicle reaches zero, and the required braking force control section increases the required braking force, when the required braking force is less than or equal to the basic braking force.

3. The braking force control device as claimed in claim 2, wherein:

the required braking force control section increases the required braking force, as the time-to-collision shortens.

4. The braking force control device as claimed in claim 3, wherein:

the required braking force control section increases the required braking force, as a time-rate-of-change in the time-to-collision increases.

5. The braking force control device as claimed in claim 1, wherein:

the required braking force control section advances actuation timing of the fluid-pressure pump to an earlier time, as the braking-force-difference time-rate-of-change increases.

6. A braking force control method for a vehicle, which method controls an automatic brake system interacting with a hydraulic brake system, the method comprising:

comparing a manual braking force created by a manual brake device with a required braking force for an automatic brake device, and selectively actuating the automatic brake device when the required braking force exceeds the manual braking force;

calculating a braking-force-difference time-rate-of-change corresponding to a rate of change per unit time in a difference, which difference is obtained by subtracting the required braking force for the automatic brake device from the manual braking force created by the manual brake device; and correcting the required braking force for the automatic brake device to reduce the required braking force when selectively actuating the automatic brake device, and correcting a reducing amount of the required braking force to decrease the reducing amount of the required braking force as the calculated braking-force-difference time-rate-of-change increases.

7. The braking force control method as claimed in claim 6, further comprising:

detecting a relative velocity between a frontally-located object ahead of the vehicle and the vehicle;

calculating, based on the relative velocity between the object and the vehicle, a time-to-collision that the vehicle is brought into collision with the object with no braking action;

calculating a basic braking force based on the time-to-collision, the basic braking force corresponding to a braking force required for braking action with a constant braking force until a relative distance between the object and the vehicle reaches zero; and increasing the required braking force, when the required braking force is less than or equal to the basic braking force.

8. The braking force control method as claimed in claim 7, wherein:

the required braking force is increased, as the time-to-collision shortens.

9. The braking force control method as claimed in claim 8, wherein:

the required braking force is increased, as a time-rate-of-chance in the time-to-collision increases.

10. The braking force control method as claimed in claim 6, wherein:

actuation timing of a fluid-pressure pump is advanced to an earlier time, as the braking-force-difference time-rate-of-chance increases.

* * * * *